United States Patent [19]

Vyvial

[11] Patent Number: 5,435,520
[45] Date of Patent: Jul. 25, 1995

[54] BACKSEAT ASSEMBLY FOR AN EXPANDING GATE VALVE

[75] Inventor: Larry A. Vyvial, Rosenberg, Tex.

[73] Assignee: Cooper Industries, Inc., Houston, Tex.

[21] Appl. No.: 302,579

[22] Filed: Sep. 7, 1994

[51] Int. Cl.⁶ .................. F16K 3/16; F16K 41/18
[52] U.S. Cl. ..................... 251/196; 251/330
[58] Field of Search ............ 251/195, 196, 203, 330

[56] References Cited

U.S. PATENT DOCUMENTS

| | | | |
|---|---|---|---|
| 2,002,780 | 5/1935 | Laurent | 251/68 |
| 2,148,628 | 2/1939 | Laurent | 251/51 |
| 2,479,124 | 11/1947 | Laurent | 251/68 |
| 2,502,689 | 4/1950 | Yant | 251/70 |
| 3,013,769 | 3/1961 | Volpin | 251/174 |
| 3,026,895 | 2/1962 | Volpin | 137/246.12 |
| 3,051,434 | 8/1962 | Gulick | 251/196 X |
| 3,412,750 | 10/1966 | Volpin | 137/315 |
| 4,682,757 | 7/1987 | Shelton | 251/330 X |

Primary Examiner—John C. Fox
Attorney, Agent, or Firm—David A. Rose

[57] ABSTRACT

A backseat assembly for an expanding gate valve includes a sealing member slidingly disposed about the stem and a biasing member biasing the sealing member away from the gate. Upon the gate and segment traveling to the open position of the valve, the segment engages the valve housing and stops its further movement. The stem and gate continue their travel with the sealing member engaging an annular seat on the housing for sealing between the stem and housing. The sealing member includes an annular resilient sealing member which initially engages the annular seat of the housing. The biasing member places a preload on the sealing member such that upon engagement of the annular seat by the sealing member, there is initial sealing force placed on the sealing engagement. The fluid pressures within the valve chamber add an additional sealing force to the sealing member.

15 Claims, 2 Drawing Sheets

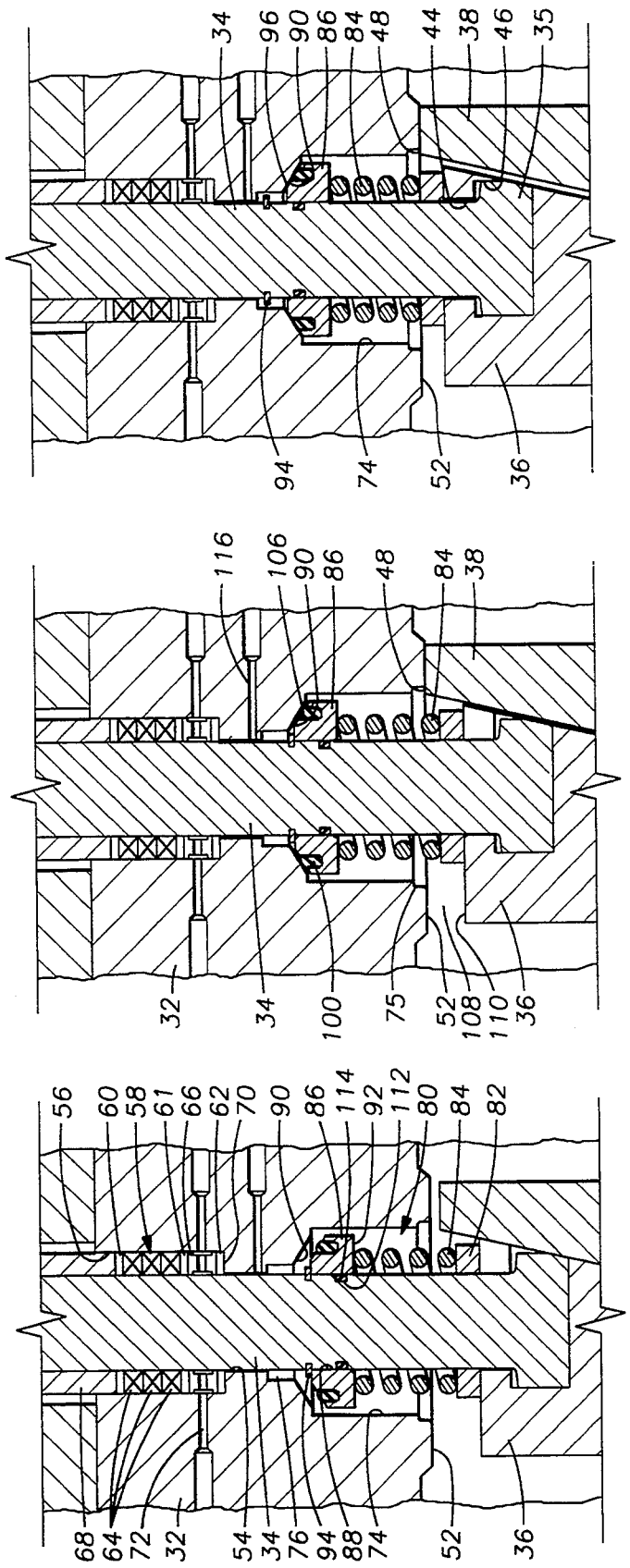
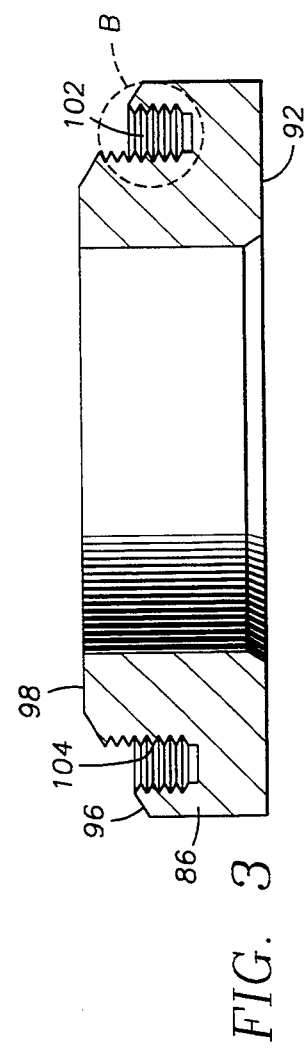

BACKSEAT ASSEMBLY FOR AN EXPANDING GATE VALVE

BACKGROUND OF THE ART

This invention relates to valves and more particularly to through conduit gate valves of the rising stem type and still more particularly to a backseat assembly for sealing the stem and bonnet of an expanding gate valve.

A through conduit gate valve of the rising stem type is well known in the art and has been specially designed to control the flow in conduits carrying fluid such as oil or gas which may be under high pressure. A through conduit gate valve is one which, with the gate in the open position, leaves the conduit unobstructed to flow.

One type of sliding gate valve is an expanding gate valve because it includes a ported gate mechanism which has double-tapered gate elements, namely, a gate and a segment which reciprocate between opposed valve seats around the through conduit. The two double-tapered sections have opposed, contacting inner faces which diverge outwardly from a central portion to provide two sets of wedging surfaces. Only the gate is attached to stem with the segment attached to the gate by linkage. Because of this construction, when the segment is at the end of its opening or closing movement, the gate is shifted relatively from a center position, along the line of travel of the gate mechanism, to effect a wedging action between the gate and segment to expand the gate mechanism and force the outer sealing faces of the gate and segment against the valve seats.

The expanding gate valve differs from a standard slab gate or a wedge gate valve in that the amount of travel of the gate is determined by the expansion of the gate and segment against the valve seats due to the wedging action. During actuation, the gate and segment move together until the segment engages the valve bonnet or housing thereby preventing its further movement. The stem of the valve continues moving causing the gate to continue its travel and expand outward into a sealing position with the valve seats. The gate mechanism operates the same in both the open and closed positions.

A packing is provided around the stem for providing a dynamic seal between the stem and the bonnet or housing of the valve. Industry has shown concern that the dynamic seal provided by the packing will allow fugitive emissions into the atmosphere. The Environmental Protection Agency is monitoring fugitive emissions of valves being used in industrial plants. Depending upon the type of fluid passing through the valve, the dynamic seal provided by the packing allows some minute leakage around the stem. Such minute emissions are inherent whenever a dynamic seal is required for sealing a moving surface such as the movement of the stem in and out of a gate valve which acts as a pressure vessel.

In the case of a fire, one of the first seals to be destroyed is that of the packing around the stem. This is particularly true in a smaller valve such as a 4" valve. Once the packing is destroyed, if there is no backseat ring, the hydrocarbon products passing through the valve then feed the fire by leaking around the stem and bonnet. The metal-to-metal seal of a backseat ring will then provide a seal if the packing is destroyed by fire.

Prior art expanding gate valves do not provide a redundant stem seal in the operating position of the valve, typically the open position. See for example U.S. Pat. Nos. 2,002,780; 2,148,628; and 2,479,124. A redundant stem seal assists in preventing fugitive emissions into the atmosphere and provides a backup seal in case of a fire.

Backseats on the stem are used in slab type gate valves such as shown in U.S. Pat. Nos. 3,013,769 and 3,412,750 and in non-standard split gate valves such as shown in U.S. Pat. Nos. 2,502,689 and 3,026,897. Typically, the stem includes an integral backseat shoulder which serves both as a backseat ring and a travel stop.

A backseat ring cannot be fixed to the stem of a through conduit gate valve of the rising stem type having expanding gates. An integral backseat disposed on the stem of an expanding gate valve would prevent the continued upward travel of the gate since the backseat ring would limit the upward travel of the stem when the backseat ring engaged the seat on the bonnet. The backseat ring cannot interfere with the travel of the gate.

The present invention overcomes the deficiencies of the prior art.

SUMMARY OF THE INVENTION

The backseat assembly of the through conduit expanding gate valve is disposed around the stem of the valve and supported by the gate. The housing of the valve includes an annular seat for sealingly engaging with the backseat assembly and a stop member for limiting the travel of the segment of the gate assembly upon moving into the open position of the valve. The backseat assembly includes a compression spring disposed between a thrust washer and a backseat ring. The thrust washer is disposed on top of the gate to which is attached one end of the stem. A retainer ring bears against the top of the backseat ring at a location on the stem such that the spring is in compression and applies a preload to the backseat ring. The backseat ring includes an annular bore in which is housed a resilient sealing member which projects from the sealing face of the backseat ring.

In operation, the gate assembly travels upward within the housing to the open position whereby the segment first engages the stop member to limit its further movement. The stem attached to the gate continues its upward travel with the resilient sealing member initially engaging an annular seat on the housing around the stem. Upon the sealing face of the backseat ring engaging the seat, the preload on the backseat ring due to the compressed spring is automatically applied to the sealing engagement between the surfaces of the annular seat and backseat ring. Further upward movement of the stem further compresses the spring to increase the sealing engagement as the retainer ring travels above the annular seat. The pressure within the valve also acts on the backseat ring to further enhance the sealing engagement between the sealing surfaces of the annular seat and backseat ring.

The backseat assembly of the present invention provides a redundant seal to the dynamic packing seal between the stem and housing. If the packing seal should leak for any reason, the backseat assembly will be in sealing engagement with the housing. Thus, the present invention is an improvement over the prior art.

Other objects and advantages of the present invention will become apparent from the following description.

BRIEF DESCRIPTION OF THE DRAWINGS

For a detailed description of the preferred embodiment of the invention, reference will now be made to the accompanying drawings wherein:

FIGS. 2A, B, and C are enlarged views of detail A shown in FIG. 1 with FIG. 2A illustrating the backseat assembly prior to engagement with the bonnet seat, FIG. 2B illustrating the backseat assembly in the initial sealing position with the bonnet seat, and FIG. 2C illustrating the backseat assembly in its final sealing position with the bonnet seat.

FIG. 3 is an enlarged vertical cross-sectional view of the backseat ring of the backseat assembly shown in FIGS. 1 and 2A, B and C.

FIG. 4 is an enlarged view of detail B of the resilient sealing member mounted on the backseat ring shown in FIG. 3.

DESCRIPTION OF THE PREFERRED EMBODIMENT

Figure 1:
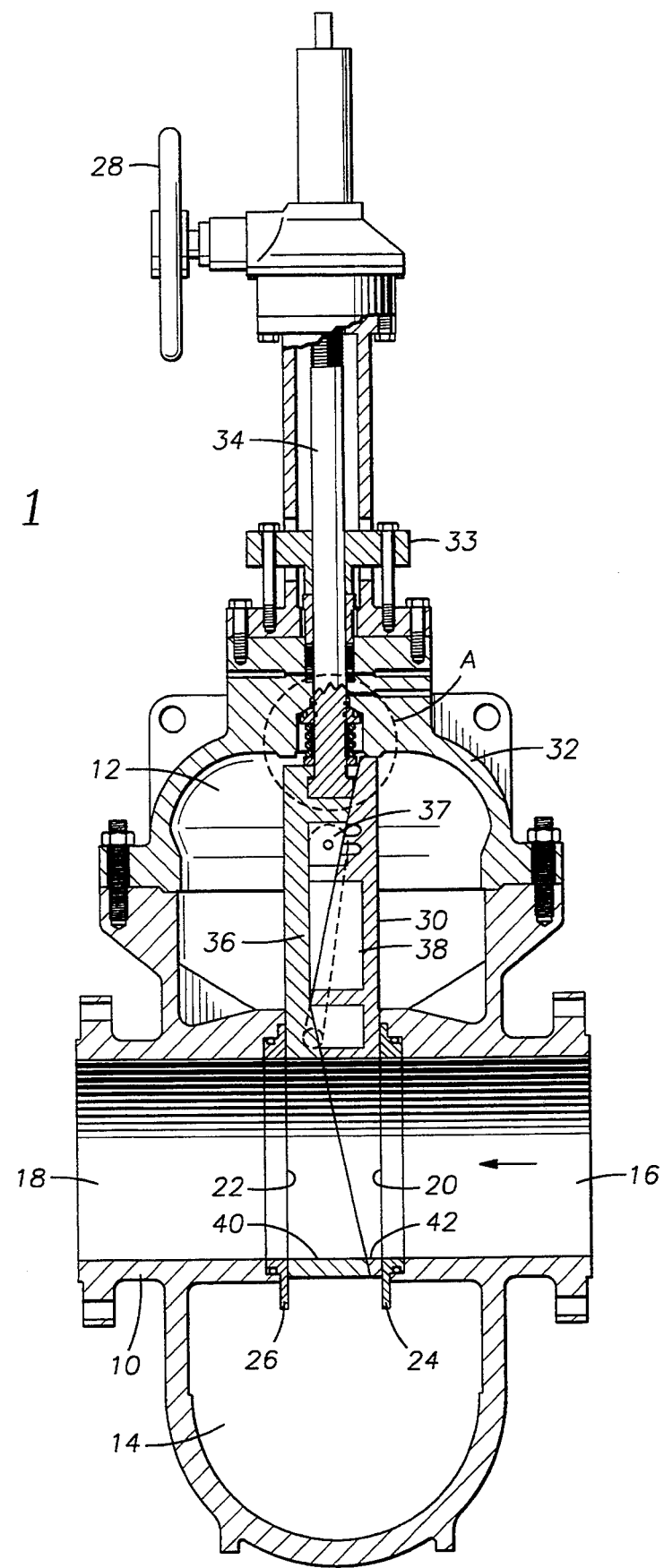
FIG. 1 is a transverse vertical section view through an expanding gate valve showing the backseat assembly of the present invention with the valve in the open position and the gate and segment expanded into sealing engagement with the valve seats.

Referring initially to FIG. 1, there is shown a through conduit gate valve of the rising stem type having a valve body 10 with an interior chamber formed by upper chamber 12 and lower chamber 14. Aligned ports 16 and 18 are formed in opposite walls of the valve body 10 and are provided with parallel valve seats 20 and 22. Seats 20, 22 have skirts 24, 26, respectively, which together with seat 20, 22 form a seat assembly which serves to guide and confine gate and segment assembly 30 to substantially rectilinear movement. A bonnet 32 forms the upper portion of valve body 10 through which extends stem 34. The stem 34 is threadingly engaged with a valve operator, such as the conventional hand wheel 28, which raises and lowers the stem 34 which is attached to the gate and segment assembly 30 to thereby open and close the valve.

The gate and segment assembly 30 which slides within the seat assembly is formed of two double-tapered, relatively displaceable sections, namely, gate 36 and segment 38. Gate 36 and segment 38 are connected by linkage 37, well known in the art, and generally reciprocate as a unit. Both the gate 36 and segment 38 have ports 40, 42 which in the open position as shown in FIG. 1 are aligned with ports 16, 18 in valve body 10 to permit unobstructed passage of fluid through the valve. The preferred direction of flow is shown by the arrow in FIG. 1 with port 16 being upstream of downstream port 18.

As best shown in FIG. 2C, the upper end of the gate 36 is detachably secured to one end of the valve stem 34 by means of a slot and T-head connection. The gate 36 includes a reduced diameter bore 44 for receiving the shaft of stem 34 and also includes an enlarged bore 46 for receiving the head 35 of stem 34. Reduced diameter bore 44 and enlarged diameter bore 46 have a U-shaped cross section in the plan view for receiving the shaft and head of stem 34. Vertical, non-rotary movement of the stem 34 by means of the wheel 28 raises and lowers the gate and segment assembly 30.

The gate 36 and segment 38, when assembled, are substantially rectangular in horizontal section so that their flat outer faces sealingly engage the corresponding flat-faced valve seats 20, 22. The inner opposed faces of gate 36 and segment 38 diverge outwardly in the same directions from a central mid portion to provide two sets of wedging surfaces. Accordingly, with relative endwise displacement of the gate 36 and segment 38 from a center position in either direction along the line of travel of the gate and segment assembly, there results a mutual wedging action between the inner contacting surfaces that is effective to expand the gate 36 and segment 38 sufficiently to force the outer sealing faces thereof into fight sealing engagement with their respective valve seats 20, 22.

As shown in FIGS. 1 and 2C, the upper terminal end 48 of segment 38 engages an annular stop shoulder 52 on bonnet 32 thereby providing a stop or limit to the upward movement or travel of segment 38 within valve body 10. Upon contact with the fixed abutment of stop shoulder 52, the upward movement of segment 38 stops and the gate 36, impelled by valve stem 34, continues its upward movement until it reaches its final limit of travel. Hence, the gate 36 and segment 38, by relative endwise displacement, are expanded into tight sealing engagement with their respective valve seats 20, 22, in both the open and closed positions of the valve. The gate 36 typically travels a fraction of an inch after the segment 38 stops its travel.

Referring now to FIGS. 2A, B and C, bonnet 32 includes a central bore 54 which receives stem 34 for reciprocation therewithin. Central bore 54 includes an upper enlarged diameter bore 56 for receiving a packing 58. Packing 58 includes braided packing rings 60, 61 and 62, a plurality of die-formed packing rings 64, and a lantern ring 66 disposed between braided packing rings 61, 62. A gland 68, supported by packing follower plate 33, compresses the packing 58 against annular shoulder 70 of bonnet 32 formed by enlarged diameter bore 56. A test port 72 extends from the exterior of bonnet 32 to lantern ring 66 for testing packing 58.

Central bore 54 also includes a lower enlarged bore 74 for receiving a backseat assembly 80. Enlarged bore 74 is generally cylindrical with a downwardly and outwardly tapering annular seat 90 located at the transition between the medial portion of central bore 54 and enlarged bore 74. A retainer ring bore 76 is disposed between seat 90 and the medial portion of central bore 54. Annular stop shoulder 52 is concentric with and located at the mouth of enlarged bore 74.

Backseat assembly 80 is mounted on the top 110 of gate 36 and includes a support ring or thrust washer 82, a compression spring 84, and a backseat ring 86. Thrust washer 82 is disposed over stem 34 and has its lower face engaging the top 110 of gate 36. Because of the U-shaped aperture 44 in gate 36 due to the connection with stem 34, there is a gap in the top 110. Thrust washer 82 covers that gap and thus provides a continuous annular surface around stem 34 against which the lower end of spring 84 may bear. Coil spring 84 is received over stem 34 and engages thrust washer 82 at its lower end. Backseat ring 86 includes a central aperture formed by cylindrical wall 88 for receiving stem 34. The lower downwardly facing side 92 of backseat ring 86 engages the top of coil spring 84.

A retainer ring 94 is affixed to the outer surface of stem 34 at a predetermined location. Retainer ring 94 retains backseat assembly 80 in assembled relationship against the top 110 of gate 36. The retainer ring 94 is utilized when the gate 36 is in the down position to prevent the backseat ring 86 from riding up further on the stem 34 and keeps the backseat ring 86 and thrust washer 82 compressed down against the top 110 of gate 36. The retainer ring 94 also maintains the entire backseat assembly 80 in compression. The retainer ring 94 is received within retainer ring bore 76 and does not engage the bonnet seat nor does it perform any sealing function. It is merely used to keep the backseat assembly 80 assembled and in compression against the gate 36.

The retainer ring 94 and the travel of gate 36 fix the extent of the movement of backseat ring 86 along stem 34. Stem 34 includes an annular groove 112 in which is housed a resilient, elastomeric annular sealing member 114, such as an 0-ring. Annular groove 112 is located on stem 34 so as to always be opposite cylindrical wall 88 through the extent of travel of stem 34 after engagement of seat 90. Elastomeric member 114 sealingly engages the cylindrical wall 88 of backseat ring 86 to provide a seal between stem 34 and backseat ring 86. Although an elastomeric sealing member is shown, if the valve pressures exceed 6,000 psi, a metal seal ring or an energized seal ring may be housed in annular groove 112.

Referring now to FIGS. 3 and 4, backseat ring 86 includes an upwardly facing, downwardly and outwardly tapering sealing surface 96. The taper of upper surface 96 corresponds with the taper of seat 90 on bonnet 32. Backseat ring 86 also includes an upwardly facing annular support surface 98 for engaging retainer ring 94. Backseat ring 86 further includes an annular groove 102 for housing an annular resilient sealing member 100. Annular groove 102 is coaxial with backseat ring 86 with its annular opening being located in tapered surface 96. The longitudinal annular sides 104 of groove 102 are serrated to retain resilient sealing member 100.

As shown in FIG. 4, resilient sealing member 100 is preferably made of Teflon, i.e. polytetrofluoroethylene, which is molded within annular groove 102. Resilient sealing member 100 includes an upwardly facing arcuate sealing surface 106 which projects out of annular groove 102 and above sealing surface 96. The resilient sealing member 100 serves as a low pressure redundant seal.

Resilient sealing member 100 is not required in the present invention where, such as in a smaller valve, the manufacturer has more greater control over the tolerances of the valve parts. When tolerances may be held close, there is less potential for deleterious to collect on the sealing surfaces between seat 90 and sealing surface 96.

A test port 116 extends from the exterior of bonnet 32 to the medial portion of stem bore 54 between packing 58 and backseat assembly 80. Test port 116 provides means for testing the integrity of the sealing engagement of backseat assembly 80 and also may be used as a means for detecting any fugitive emissions.

The spring 84 is a biasing member which serves as a means for compensating the differences in travel of the gate 36 in the open position. As shown in FIG. 2B, once the top 48 of segment 38 engages annular stop shoulder 52, the upward travel of segment 38 is halted. However, since stem 34 is only attached to gate 36, stem 34 and gate 36 continue their upward travel with backseat assembly 80 being supported on top of gate 36. An annular clearance area or gap 108 is provided between annular stop shoulder 52 on bonnet 32 and the top 110 of gate 36 thus allowing continued further travel and movement of gate 36 with respect to bonnet 32. The entrance 75 of enlarged bore 74 is widened to assure entry of backseat assembly 80 into 74 due to any misalignment.

As best shown in FIG. 2A, spring 84 is preloaded. Retainer ring 94 is affixed on stem 34 a predetermined distance above the top 110 of gate 36 which is less than the stack height of the retainer assembly 80 with spring 84 in a non-compressed state. Thus, retainer ring 94 locates backseat ring 86 on stem 34 at a location with respect to thrust ring 82 that causes spring 84 to be compressed between backseat ring 86 and thrust washer 82. This compression is a predetermined amount so as to place a preload on backseat ring 86. The amount of the pre-load spring force is a function of the size of the seal to be established, which in turn is a function of the size of the vane. The spring 84 may only be sized to provide the minimum load required taking into account the manufacturing tolerances of the parts of the valve. The type of plastic seal being used for the resilient sealing ring 100 is also taken into account in the preload of the spring 84 so that there is a predetermined load on the resilient sealing ring 100 to effect an initial low pressure seal.

Referring now to FIG. 1, in operation, the stem actuator 28 moves the stem 34 upwardly within the bonnet 32 causing the gate 36 and segment 38 to travel upwardly within upper chamber 12. FIG. 2A illustrates the position of the backseat assembly 80 prior to sealing engagement with seat 90. As shown, spring 84 has a predetermined preload based upon the size of the particular valve involved.

Referring now to FIG. 2B, the top 48 of segment 38 engages the annular stop shoulder 52 of bonnet 32 thereby stopping any further upward travel of segment 38. Stem 34 continues to rise causing further upward travel of gate 36 within annular clearance 108. The upwardly facing arcuate sealing surface 106 of resilient sealing member 100 initially makes sealing contact with downwardly facing seat 90 thus establishing the initial seal between seat 90 and retaining ring 86. The resilient sealing member 100 provides a low pressure seal where the flowing pressure through the valve is low.

Referring now to FIG. 2C, upon the sealing surface 96 engaging seat 90 on bonnet 32, and the initiation of the retraction of backseat ring 86 from retainer ring 94, an immediate preload is applied to the sealing surfaces due to the pre-compression of spring 84. Thus, as the backseat ring 86 disengages from retainer ring 94, spring 84 automatically applies an initial force to the backseat ring 86 which in turn applies such force to the mating sealing surfaces to achieve a low pressure seal. The retainer ring 94 continues its upward movement into annular retainer bore 76. The further upward movement or travel of gate 36 is prevented by the wedging action of gate 36 and segment 38 with valve seats 20, 22.

The fluid pressure within conduit 16, 18 passes into upper chamber 12 as the gate and segment assembly 30 travels toward the open position. This pressure within upper chamber 12 is applied to backseat ring 86 and thus adds to the sealing pressure between the seat 90 and backseat ring 86. The pressure in upper chamber 12 is substantially the same as the pressure of the fluid passing through the valve. Thus, once the seal with seat 90 is initialized, the backseat ring energizes itself due to the pressure within upper chamber 12.

The backseat assembly 80 of the present invention provides a redundant seal to packing 58. In particular, backseat assembly 80 provides a redundant seal in case of fire or to prevent the leakage of fugitive emissions.

Typically, the present invention is used with large bore valves such as a 6 inch valve or larger. In the case of a fire, the large body mass of a larger valve serves as a heat sink whereby the subjection of the exterior of the valve to the extreme heat caused by a fire does not correspondingly raise the temperature of that portion of the valve body adjacent resilient sealing member 100 and elastomeric sealing member 114 so as to destroy members 100, 114. Even if elastomeric sealing member 114 were to be destroyed in the case of a fire, the backseat assembly 80 would substantially reduce the leakage between upper chamber 12 and the atmosphere.

Although the present invention may be used in valves having a pressure rating up to 6,000 psi, in a small bore valve with metal-to-metal seals, the present invention could be used with pressures up to 30,000 psi.

Another advantage of the present invention is that the backseat assembly 80 may be used to replace packing 58. If the packing 58 around stem 34 begins to leak, the gate and segment assembly 30 may be raised to backseat the backseat assembly 80 on seat 90 to seal off upper chamber 12. At that time, the packing follower plate 33 may be removed so that the packing 58 may be replaced.

It should be appreciated that the present invention has been described for use with a normal acting gate valve. In a normal acting gate valve, the gate and segment assembly 30 includes ports 40, 42 for alignment with flow ports 16, 18 in valve body 10 in the open position. In a normal acting gate valve, the valve is opened with the gate and segment assembly 30 is in its uppermost position. It should be appreciated that the present invention may be used in a reverse acting gate valve where the flow ports in the gate and segment assembly 30 are located in the upper portion of gate and segment assembly 80 such that flow ports 16, 18 are closed upon the gate and segment assembly 30 being moved to its uppermost position. In a reverse acting gate valve, upon lowering the gate and segment assembly 30 to its lowermost position, the flow ports through the gate and segment assembly 30 are in alignment with valve ports 16, 18 such that the valve is in the open position.

While a preferred embodiment of the invention has been shown and described, modifications thereof can be made by one skilled in the art without departing from the spirit of the invention.

I claim:

1. A gate valve comprising:
   a housing having a chamber with a flow passage therethrough and a stem-receiving bore transverse of said flow passage;
   an expanding gate member including first and second segments reciprocable in said housing transversely of said flow passage, said first and second segments having wedging surfaces causing said gate member to expand as said first segment travels axially away from said second segment;
   a stem member connectable at one end to said first segment and connectable at another end to a means for reciprocating said stem;
   said housing having an annular seat about said bore facing said chamber and a stop member for engaging said second segment;
   a sealing member slidingly disposed about said stem and supported by said first segment;
   a biasing member disposed between said first segment and said sealing member for biasing said sealing member away from said first segment;
   whereby upon said stop member engaging said second segment, said stop member limiting the travel of said second segment allowing continued travel of said first segment for said expanding gate member, said biasing member biasing said sealing member into sealing engagement with said annular seat to seal said stem with respect to said housing.

2. The gate valve of claim 1 wherein said seat and said sealing member have mating tapered surfaces to effect a seal therebetween.

3. The gate valve of claim 1 wherein said sealing member houses an annular resilient sealing member for sealingly engaging said seat.

4. The gate valve of claim 3 wherein said sealing member includes an annular groove in which is housed said annular resilient sealing member.

5. The gate valve of claim 4 wherein said annular groove includes serrated annular sides for maintaining said annular resilient sealing member in said groove.

6. The gate valve of claim 3 wherein said annular resilient sealing member projects away from said sealing member whereby said annular resilient sealing member provides the initial sealing contact with said annular seat.

7. The gate valve of claim 3 wherein said resilient sealing member is made of polytetrofluoroethylene.

8. The gate valve of claim 1 further including a retainer member disposed on said stem for maintaining said biasing member in compression against said first segment causing said biasing member to preload to said sealing member.

9. The gate valve of claim 8 wherein said biasing member applies a preload to said sealing member to effect an initial low pressure seal.

10. The gate valve of claim 1 further including a thrust washer disposed between said biasing member and said first segment.

11. The gate valve of claim 1 further including an elastomeric sealing member housed on said stem member for sealingly engaging said sealing member.

12. The gate valve of claim 1 wherein said seat further compresses said biasing member upon said stem and said first segment reaching the upper limit of their travel within said bore.

13. The gate valve of claim 1 wherein the pressure within said chamber applies a load on said sealing member to enhance sealing engagement with said seat.

14. The gate valve of claim 1 further including a test bore disposed in said housing for detecting leakage around said sealing member.

15. The gate valve of claim 1 further including stem packing disposed between said stem and said housing for sealingly engaging said stem and housing.

* * * * *